(12) United States Patent
Myers

(10) Patent No.: US 11,317,617 B1
(45) Date of Patent: *May 3, 2022

(54) MINNOW CONTAINER

(71) Applicant: CarLyd Enterprises, East Earl, PA (US)

(72) Inventor: Bradley Walter Myers, East Earl, PA (US)

(73) Assignee: PRODUCTIVE ALTERNATIVES, INC., Fergus Falls, MN (US)

( * ) Notice: Subject to any disclaimer, the term of this patent is extended or adjusted under 35 U.S.C. 154(b) by 938 days.

This patent is subject to a terminal disclaimer.

(21) Appl. No.: 15/810,097

(22) Filed: Nov. 12, 2017

Related U.S. Application Data

(63) Continuation-in-part of application No. 14/683,404, filed on Apr. 10, 2015, now Pat. No. 9,814,225.

(60) Provisional application No. 62/071,373, filed on Sep. 23, 2014.

(51) Int. Cl.
*A01K 97/05* (2006.01)
*A01K 97/04* (2006.01)

(52) U.S. Cl.
CPC .............. *A01K 97/05* (2013.01); *A01K 97/04* (2013.01)

(58) Field of Classification Search
CPC ................................. A01K 97/05; A01K 97/04
USPC ............... 43/56, 57, 55; 222/189.06, 189.07, 222/189.09; 210/295, 296, 299
See application file for complete search history.

(56) References Cited

U.S. PATENT DOCUMENTS

| | | | | |
|---|---|---|---|---|
| 299,690 A * | 6/1884 | Sherwood | ............. | A01K 97/05 43/56 |
| 302,086 A * | 7/1884 | Barton | .................... | A01K 97/05 43/56 |
| 321,606 A * | 7/1885 | Hough | .................... | A01K 97/05 43/56 |
| 372,233 A * | 10/1887 | Northrop | ............... | A01K 97/05 43/56 |
| 458,529 A * | 8/1891 | Williams | ............... | A01K 97/05 43/56 |
| 504,526 A * | 9/1893 | Hemp | .................... | A01K 97/05 43/56 |
| 647,257 A * | 4/1900 | Gray | ....................... | A01K 97/05 43/57 |
| 661,093 A * | 11/1900 | Warren | .................. | A01K 97/05 43/56 |

(Continued)

FOREIGN PATENT DOCUMENTS

| | | | | |
|---|---|---|---|---|
| CA | 2873480 C | * | 9/2016 | ............. A01K 97/05 |
| GB | 2495946 A | * | 5/2013 | ............. A01K 97/04 |

(Continued)

*Primary Examiner* — Darren W Ark
(74) *Attorney, Agent, or Firm* — Gugliott & Gugliotti LPA

(57) ABSTRACT

A container for animals or objects in a liquid is disclosed. The container comprises a cylinder capped by two removable lids and a floating basket. When one of the lids is removed, the liquid may be drained and refreshed without either the basket or the contained animals or objects falling out. When the other lid is removed, the basket floats above the liquid and carries the animals or objects out of the liquid where they can be easily removed by a user. The container is useful to anglers who use live minnows as bait, but may be useful in several other applications. The instant abstract is neither intended to define the invention disclosed in this specification nor intended to limit the scope of the invention in any way.

5 Claims, 19 Drawing Sheets

(56) References Cited

U.S. PATENT DOCUMENTS

| | | | | |
|---|---|---|---|---|
| 713,890 A * | 11/1902 | Koch | A01K 97/05 | 43/56 |
| 769,874 A * | 9/1904 | Paar | A01K 97/05 | 43/56 |
| 1,110,892 A * | 9/1914 | Cather | A01K 97/05 | 43/56 |
| 1,436,835 A * | 11/1922 | Van Pelt | A01K 97/05 | 43/56 |
| 1,508,903 A * | 9/1924 | Strandt | B67C 3/04 | 137/432 |
| 1,528,465 A * | 3/1925 | Burbank | A01K 97/05 | 43/56 |
| 1,635,175 A * | 7/1927 | Corwin | F02M 1/00 | 137/398 |
| 1,897,571 A * | 2/1933 | Camporini | A01K 97/05 | 43/56 |
| 1,942,756 A * | 1/1934 | Howard | A01K 97/05 | 43/56 |
| 2,002,572 A * | 5/1935 | Forbes | A01K 97/05 | 43/56 |
| 2,020,536 A * | 11/1935 | Cox | A01K 97/05 | 43/56 |
| 2,093,132 A * | 9/1937 | Logan | A01K 97/05 | 43/56 |
| 2,181,612 A * | 11/1939 | Smith | A47J 43/27 | 222/189.08 |
| 2,216,202 A * | 10/1940 | Lake | A01K 97/05 | 43/56 |
| 2,244,457 A * | 6/1941 | Hartford | A01K 97/05 | 43/56 |
| 2,294,136 A * | 8/1942 | Smith | A01K 97/05 | 43/56 |
| 2,318,842 A * | 5/1943 | Eaton | B65D 83/005 | 134/135 |
| 2,341,246 A * | 2/1944 | Stowe | A01K 97/05 | 43/56 |
| 2,474,745 A * | 6/1949 | Lewis | A01K 97/05 | 43/56 |
| 2,489,710 A * | 11/1949 | Janisch | A01K 97/05 | 43/56 |
| 2,531,628 A * | 11/1950 | Janisch | A01K 97/05 | 43/56 |
| 2,540,758 A * | 2/1951 | Rinnman | F24F 3/1411 | 96/148 |
| 2,560,672 A * | 7/1951 | Volenec | A01K 97/05 | 43/57 |
| 2,564,598 A * | 8/1951 | Grimshaw | A01K 97/05 | 43/56 |
| 2,568,602 A * | 9/1951 | Anderson | A01K 97/04 | 43/55 |
| 2,573,352 A * | 10/1951 | Nicodemus | A01K 97/20 | 43/55 |
| 2,594,172 A * | 4/1952 | Huffman | A01K 97/05 | 43/56 |
| 2,595,726 A * | 5/1952 | Swanbeck | A01K 97/05 | 43/56 |
| 2,597,002 A * | 5/1952 | Johnson | A01K 97/05 | 43/55 |
| 2,600,826 A * | 6/1952 | Allen | A01K 97/05 | 43/56 |
| 2,613,843 A * | 10/1952 | Suda | A01K 97/05 | 43/56 |
| 2,630,651 A * | 3/1953 | McGee | A01K 97/04 | 43/55 |
| 2,656,640 A * | 10/1953 | Johnson | A01K 97/05 | 43/56 |
| 2,663,115 A * | 12/1953 | McKissack | A01K 97/05 | 43/57 |
| 2,664,854 A * | 1/1954 | Talbot | A01K 97/04 | 118/417 |
| 2,674,825 A * | 4/1954 | Rice | A01K 69/08 | 43/56 |
| 2,720,049 A * | 10/1955 | Basky | A01K 97/05 | 43/56 |
| 2,731,760 A * | 1/1956 | Ebert | A01K 97/05 | 43/57 |
| 2,734,305 A * | 2/1956 | Hannah | A01K 97/05 | 43/56 |
| 2,963,814 A * | 12/1960 | Zabrocki | A01K 97/05 | 43/56 |
| 3,000,132 A * | 9/1961 | Koistinen | A01K 97/05 | 43/56 |
| 3,002,312 A * | 10/1961 | Barker | A01K 97/05 | 43/56 |
| 3,212,210 A * | 10/1965 | Schmelzer, Jr. | A01K 97/05 | 43/57 |
| 3,248,016 A * | 4/1966 | Dahl | B65D 25/20 | 222/189.07 |
| 3,334,438 A * | 8/1967 | Fellers | A01K 97/05 | 43/56 |
| 3,423,869 A * | 1/1969 | Duerst | A01K 97/04 | 43/55 |
| 3,468,289 A * | 9/1969 | Broida | B65D 25/14 | 119/6.5 |
| 3,499,244 A * | 3/1970 | Malone | A01K 97/05 | 43/56 |
| 3,509,657 A * | 5/1970 | Bross, Jr. | A01K 97/05 | 43/57 |
| 3,510,978 A * | 5/1970 | Murdock | A01K 75/02 | 43/17.1 |
| 3,726,039 A * | 4/1973 | Borrelli | A01K 97/05 | 43/56 |
| 3,751,845 A * | 8/1973 | van Leeuwen | A01K 97/06 | 43/56 |
| 3,831,310 A * | 8/1974 | Frangullie | A01K 97/05 | 43/56 |
| 3,834,062 A * | 9/1974 | Nalepka | A01K 97/05 | 43/56 |
| 3,955,306 A * | 5/1976 | Handa | A01K 97/05 | 43/56 |
| 4,030,227 A * | 6/1977 | Oftedahl | A01K 97/05 | 43/56 |
| 4,158,267 A * | 6/1979 | Farnsworth | A01K 97/04 | 43/55 |
| 4,450,647 A * | 5/1984 | Schmidt | A01K 97/05 | 220/592.27 |
| 4,513,525 A * | 4/1985 | Ward | A01K 97/05 | 43/55 |
| 4,606,143 A * | 8/1986 | Murphy, Jr. | A01K 97/05 | 43/56 |
| 4,642,934 A * | 2/1987 | Carlson | A01K 97/20 | 220/495.03 |
| 4,686,788 A * | 8/1987 | Hartman | A01K 97/05 | 206/315.11 |
| 4,864,769 A * | 9/1989 | Sandahl | A01K 97/05 | 43/55 |
| 4,890,413 A * | 1/1990 | Nelson | A01K 97/20 | 43/55 |
| 5,109,625 A * | 5/1992 | Skrede | A01K 97/05 | 220/263 |
| 5,120,454 A * | 6/1992 | Wieties | B01D 29/96 | 210/767 |
| 5,123,198 A * | 6/1992 | Von Grossmann | A01K 97/05 | 43/55 |
| 5,138,975 A * | 8/1992 | Walsh | A01K 63/02 | 119/203 |
| 5,481,823 A * | 1/1996 | Hoover | A01K 97/04 | 43/55 |
| 5,507,113 A * | 4/1996 | Keller | A01K 97/05 | 206/315.11 |
| 5,586,406 A * | 12/1996 | Lin | A01K 97/04 | 43/55 |
| 5,661,924 A * | 9/1997 | Maxwell | A01K 97/05 | 43/55 |
| 6,354,246 B1 * | 3/2002 | Kamihata | A01K 63/02 | 119/496 |
| 6,421,951 B1 * | 7/2002 | Kuhl | A01K 97/05 | 43/55 |

(56) References Cited

U.S. PATENT DOCUMENTS

| | | | | |
|---|---|---|---|---|
| 6,442,887 B2 * | 9/2002 | Sanquist | ............... | A01K 97/05 43/55 |
| 6,857,222 B1 * | 2/2005 | King | ............... | A01K 97/05 43/55 |
| 6,886,291 B1 * | 5/2005 | Jaggers | ............... | A01K 97/05 43/55 |
| 7,299,585 B2 * | 11/2007 | Perttu | ............... | A01K 97/05 43/56 |
| 7,644,535 B2 * | 1/2010 | Sloop | ............... | A01K 97/05 43/56 |
| 7,946,250 B2 * | 5/2011 | Holms | ............... | A01K 63/006 119/265 |
| 8,695,536 B2 * | 4/2014 | Hendey, III | ............... | A63H 33/00 119/247 |
| 8,845,895 B1 * | 9/2014 | Ghiassi | ............... | C02F 1/002 210/232 |
| 9,615,563 B2 * | 4/2017 | Fontaine | ............... | A01K 97/04 |
| 9,814,225 B2 * | 11/2017 | Myers | ............... | A01K 97/05 |
| 9,918,460 B2 * | 3/2018 | Paquette | ............... | A01K 97/05 |
| 10,542,737 B2 * | 1/2020 | Beach | ............... | A01K 97/05 |
| 2005/0086851 A1 * | 4/2005 | Carden, Jr. | ............... | A01K 97/05 43/55 |
| 2008/0190011 A1 * | 8/2008 | Neal | ............... | A01K 97/05 43/56 |
| 2012/0110890 A1 * | 5/2012 | Garrett | ............... | A01K 97/20 43/55 |
| 2015/0107149 A1 * | 4/2015 | Garrett | ............... | A01K 97/20 43/55 |

FOREIGN PATENT DOCUMENTS

| | | | |
|---|---|---|---|
| JP | 08191645 A | * | 7/1996 |
| JP | 09037697 A | * | 2/1997 |
| JP | 10323151 A | * | 12/1998 |
| JP | 2002186393 A | * | 7/2002 |
| JP | 2005087081 A | * | 4/2005 |

* cited by examiner

MINNOW CONTAINER

RELATED APPLICATIONS

The present application is a continuation of U.S. Ser. No. 14/683,404 filed on Apr. 10, 2015, which claimed the benefit of U.S. Provisional Application 62/071,373 filed on Sep. 23, 2014. Both related applications are incorporated by reference as if fully rewritten herein.

BACKGROUND OF THE INVENTION

1. Field of the Invention

The subject matter of this application pertains to devices for storing objects in liquid. More particularly, the subject matter of this application pertains to devices for storing objects in liquid which can be retrieved by a user without needing to reach into the liquid. Even more particularly, the subject matter of this application pertains to devices for storing bait fish such as minnows in water and allowing the user to remove one or more fish as needed without having to reach into the water and try to catch one.

2. Description of the Related Art

There are basically two types of bait an angler can use to catch fish: artificial lures and natural bait. Artificial lures have their fans and have certain advantages. For example, they can last indefinitely, be repeatedly used and even passed down to others, and can be painted bright, garish colors or have mirrored surfaces that stand out from their surroundings. Live bait, however, is still preferred by many anglers. Live bait will swim or struggle naturally when impaled on a hook, thereby attracting nearby fish. Live bait also has a certain smell that a plastic lure doesn't, which may be detected by the sought after fish. Live bait is also something a fish would ordinarily recognize as food, increasing the likelihood of a hit by a fish.

Live bait however, does have it's drawbacks. The number that a person can carry is finite, and although a minnow may live for a few casts, its attractiveness as a bait diminishes when it dies. If an angler runs out of live bait, or the bait dies before it can be used, the alternatives are to fall-back on an artificial lure or stop fishing; neither of which is a good option. As used herein, "minnow" should be understood to comprise all species of fish and other aquatic animals suitable as bait.

Most typically, anglers using live bait carry them in a minnow bucket, which, in its most basic form, is simply a pail. Often a sample of minnows are removed from the bucket to a smaller, more portable minnow jar. As used herein, "minnow container" or "container" is used to refer to either minnow buckets or pails. Over the last couple hundred years, other than changes in the materials used to construct them, little about minnow containers has changed. Although delving one's hand into water vessel to catch a minnow might sound like fun, it's not always easy to catch and pull one out without mangling it. At least, it's not easy until they die, which can easily happen if the level of dissolved oxygen in the water drops too low. Since minnow activity is related to the dissolved oxygen concentration, a careful angler will periodically assess minnow activity and attempt to change or aerate the water when activity slows. The oxygen level will more quickly drop with a high concentration of minnows, and a low concentration of minnows makes it more difficult to catch one in the bucket. Although perhaps not the biggest dilemma one might face, it remains a persistent one for anglers.

There have been patented minnow containers that have tried to mitigate this dilemma by either claiming to make the minnows easier to grab, such as U.S. Pat. Nos. 302,086 and 1,986,742; but most work in the minnow container art has been directed towards aerating the water such as U.S. Pat. Nos. 553,456, 2,706,870, and 2,998,671. The mentioned patents are not meant to be reflective of an exhaustive search, but are merely demonstrative of patents in this art. Certainly, other art exists.

Consequently, a need has been felt for providing an apparatus and method which allows a user to maintain live bait without the problems associated with retrieving such live bait, especially during active fishing.

SUMMARY OF THE INVENTION

The subject matter of this application relates broadly to devices that house materials or creatures in liquid. More particularly, it pertains to devices that contain minnows or other live creatures in water (a "container" or "minnow container").

Although as any angler will agree, the worst day fishing is still better than the best day working, an improved minnow container would make fishing even more pleasant.

One objective of the subject matter of this application is to provide a minnow container that lifts minnows out of the water when desired so that the user may easily grab one. Another objective is to provide a minnow container that can be emptied and refilled with water without losing the minnows also in the bucket. A further objective of the subject matter of this application is to provide a minnow container that can easily be worn by a user. Yet another objective is to provide a minnow container which can house a larger concentration of minnows than other similarly sized minnow containers because the water can be easily and rapidly refreshed when minnow activity slows, indicating a lower dissolved oxygen concentration in the water.

The device comprises a top lid, a bottom lid, and a water permeable floating basket. When the device is inverted and the bottom lid is removed, the basket carries the fish to the top of the device and largely out of the water allowing them to be easily grasped. When the top lid is removed, the water can be poured out and replaced while the bottom of the basket prevents the fish being escaping.

In use, the disclosed minnow container comprises a floating basket, minnows, and water. The container is most preferably an annular cylinder comprising detachable lids on the top and the bottom of the cylinder such that the container is essentially water-tight when the lids are properly situated. The basket is water permeable. When one of the lids is removed, the basket floats towards the surface of the water and carries the minnows so that they are largely out of the water, but still surrounded by the side of the basket so they don't flop out of the bucket. The basket may be prevented from falling out of the cylinder by a blocking structure. When the other lid is removed, the bottom of the basket floats towards the top of the water and is held from moving past the surface of the cylinder so that the basket can be tilted to pour off deoxygenated water without losing the minnows and refilled with fresh oxygenated water.

The disclosed minnow container's cylinder is preferably substantially clear so the user can quickly assess the activity level of the minnow and refresh the water as needed. This along with the ease of which water can be replaced allows an angler to carry a higher density of minnows than would be practicable with other buckets that are either opaque or less easily refreshed.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
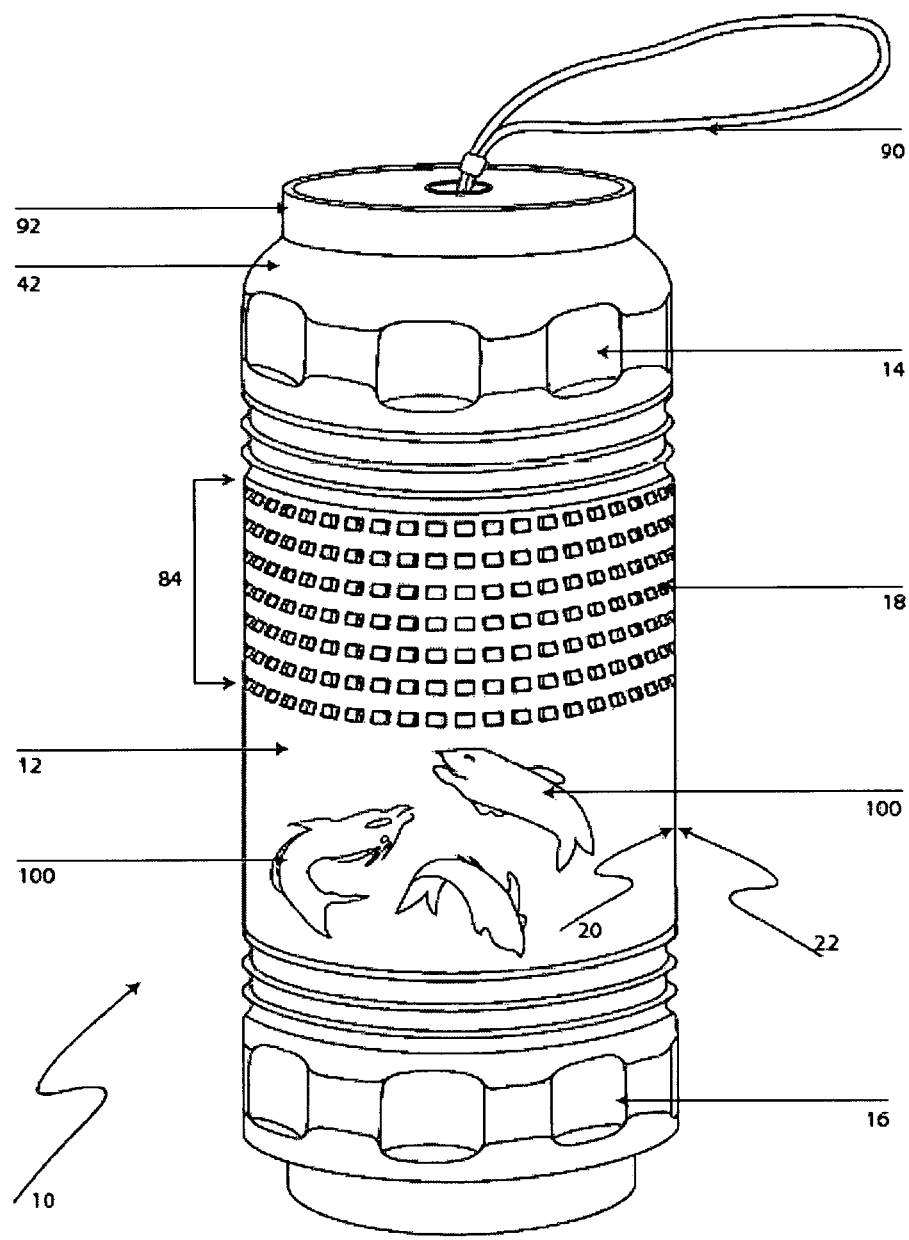
FIG. 1 shows a front perspective view of a minnow container 10 according to the preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a minnow container, generally noted as 10, is shown according to the preferred embodiment of the present invention. The minnow container 10 comprises generally: a cylinder 12, a first lid 14, a second lid 16, and a water-permeable basket 18.

The cylinder 12 is substantially annular and comprises an inner surface 20 having a first diameter, an outer surface 22 having a second diameter, an open first terminus 24, an open second terminus 26, a longitudinal axis 28, and a transverse axis 30. The cylinder 12 further comprises a height measured along its longitudinal axis 28. The cylinder 12 further comprises a blocking means located near, or at the level of the first terminus 24. In a most preferred embodiment this blocking means comprises a lip 32 formed along the inner surface 20 of the cylinder 12 within several millimeters of the cylinder's first terminus 24. This lip 32 prevents the basket 18 from falling out of the cylinder 12 when the cylinder's first lid 14 is removed. Other embodiments may utilize other blocking means to fulfill the same objective of keeping the floating basket 18 from falling out of the cylinder 12 when tilted to pour out water, and all should be considered to fall within the scope of the claims. One such alternative blocking means comprises one or more strips of material extending across the cylinder's open first terminus 24 that prevent the basket 18 from falling out of the cylinder 12 when tilted. Another alternative blocking means comprises a net or similar piece of cloth stretched over the first open terminus 24. Yet another alternative blocking means may be integrated into the container's first lid 14. Such a lid 14 may comprise a flip-top portion which, when opened, exposes a plurality of holes that allow water to flow out of the cylinder but retain the floating basket 18. Such shaker lids are known in the art and as often used with herb containers. The cylinder 12 is at least partially transparent.

Figure 5:
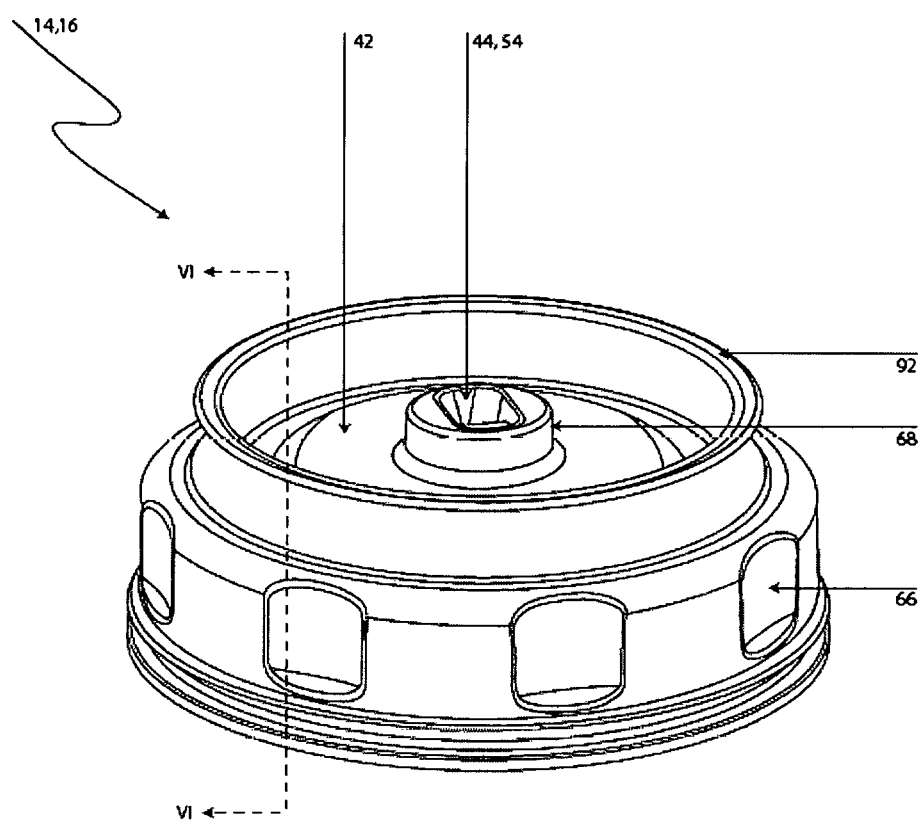
FIG. 5 is a top perspective view of a first lid 14 for use therein, with the second lid 16 being of a similar construction.
Figure 6:
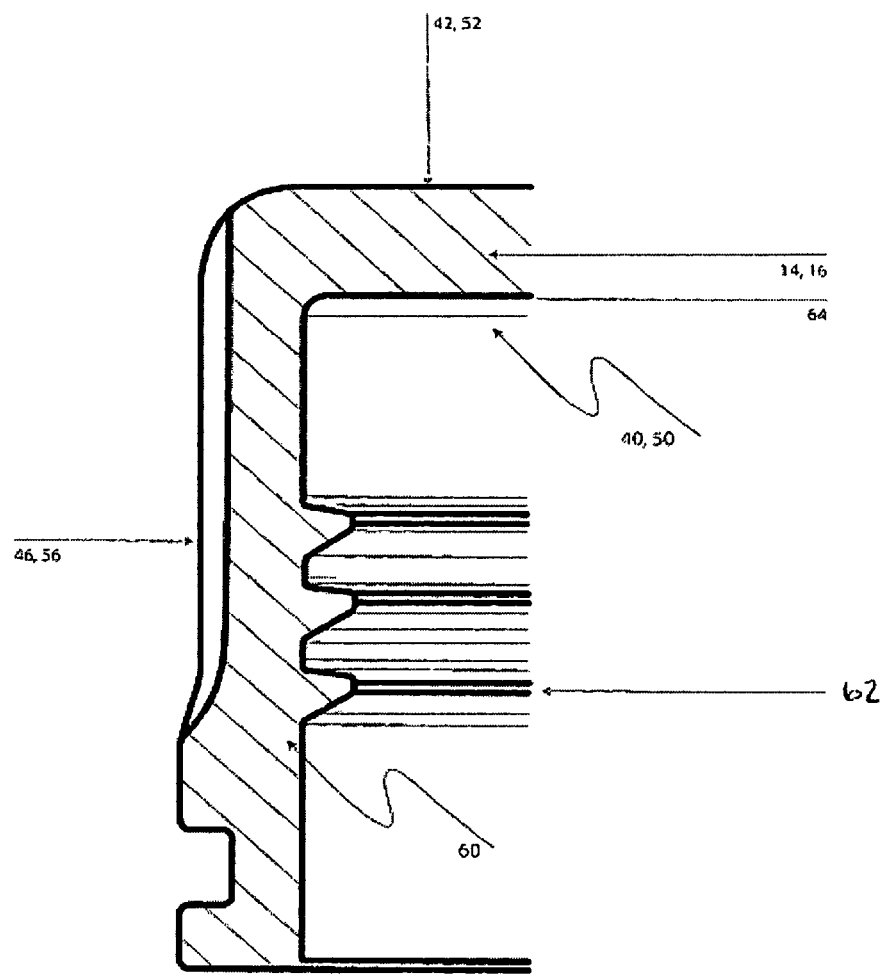
FIG. 6 is a cross section taken along line VI-VI of FIG. 5.
Figure 7:
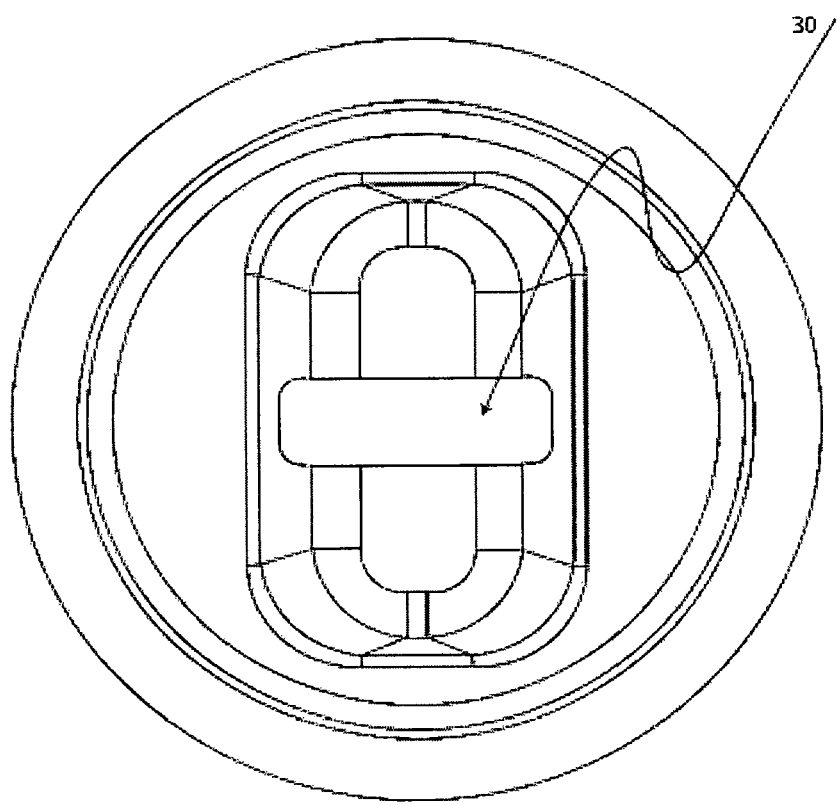
FIG. 7 is a partial detailed top plan view of the lid 14 of FIG. 5.
Figure 8:
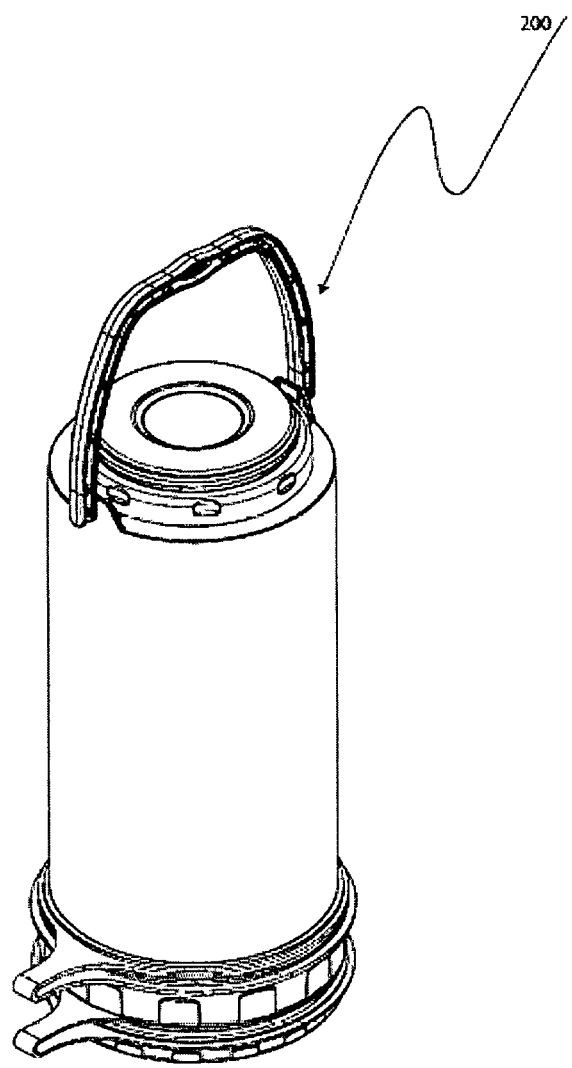
FIG. 8 is a front perspective view of a minnow container 200 according to a first alternate embodiment of the present invention.
Figure 9:
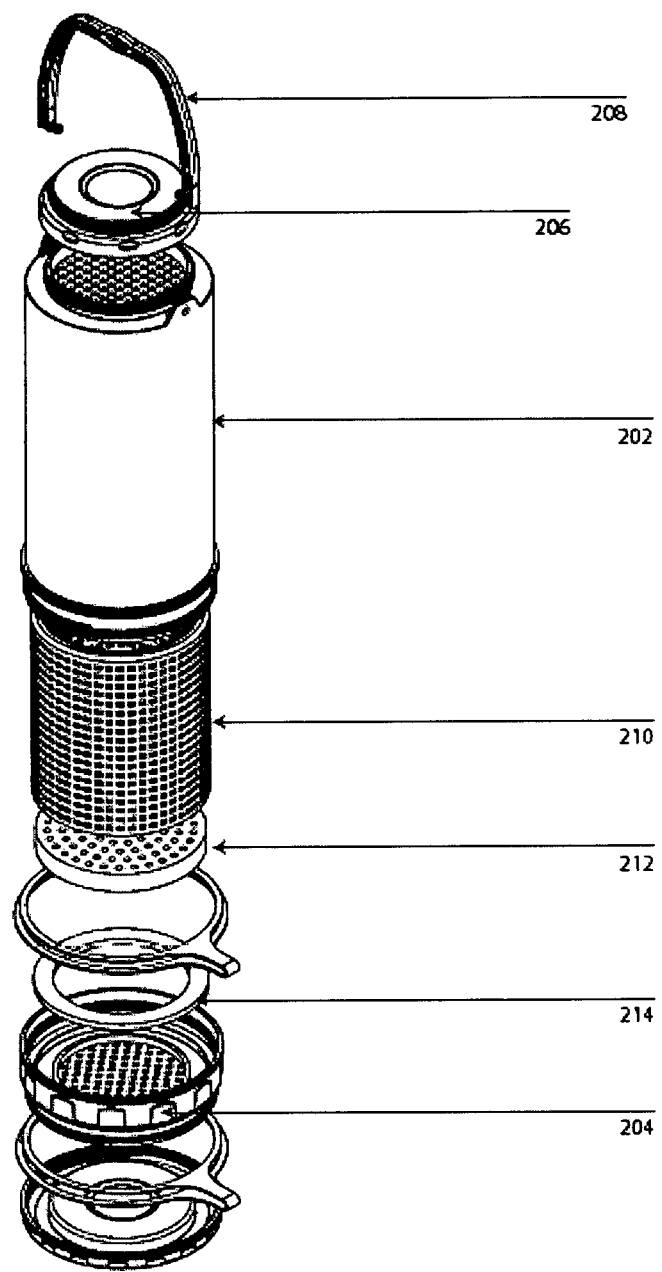
FIG. 9 is an explode perspective view thereof.
Figure 10:
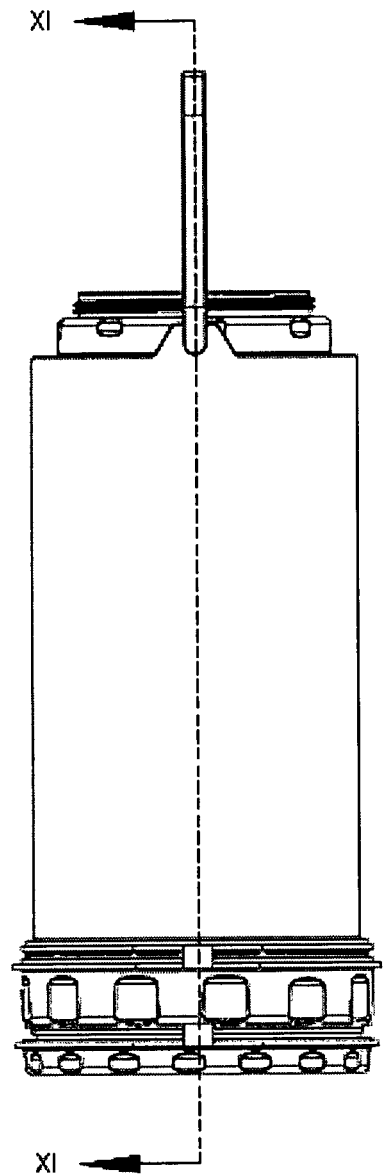
FIG. 10 is front elevational view thereof.
Figure 11:
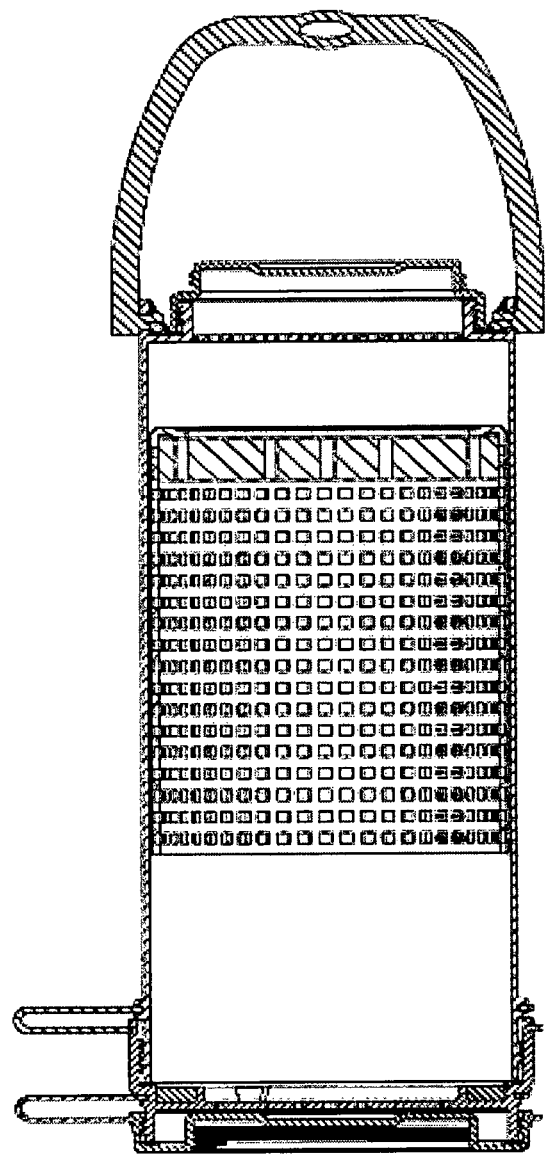
FIG. 11 is a sectional view taken along line XI-XI of FIG. 10.
Figure 12:
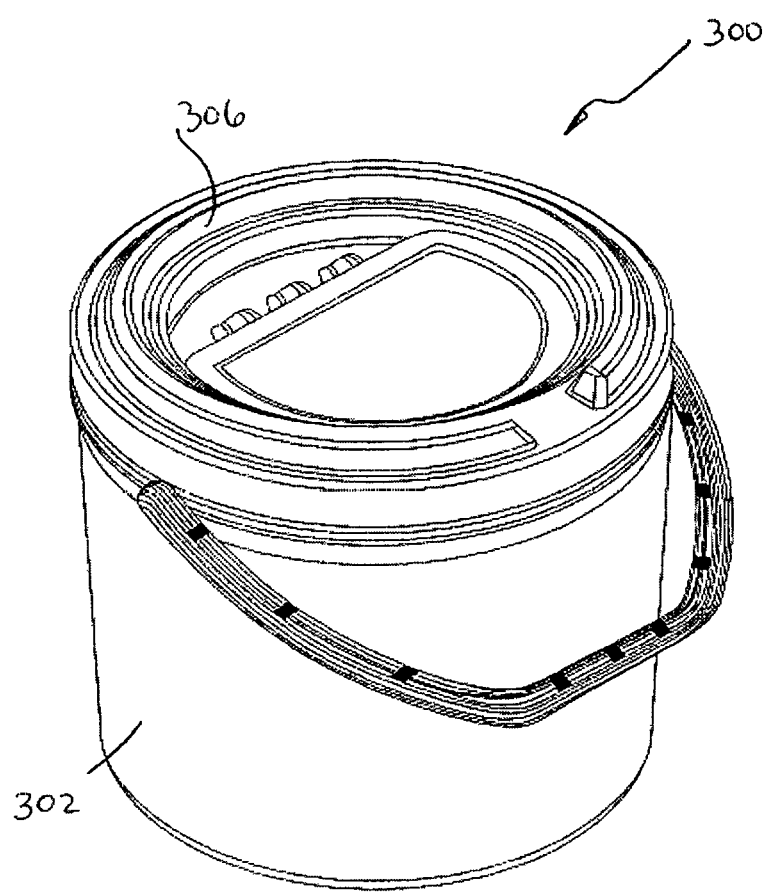
FIG. 12 is a front perspective view of a minnow container 300 according to a second alternate embodiment of the present invention.
Figure 13:
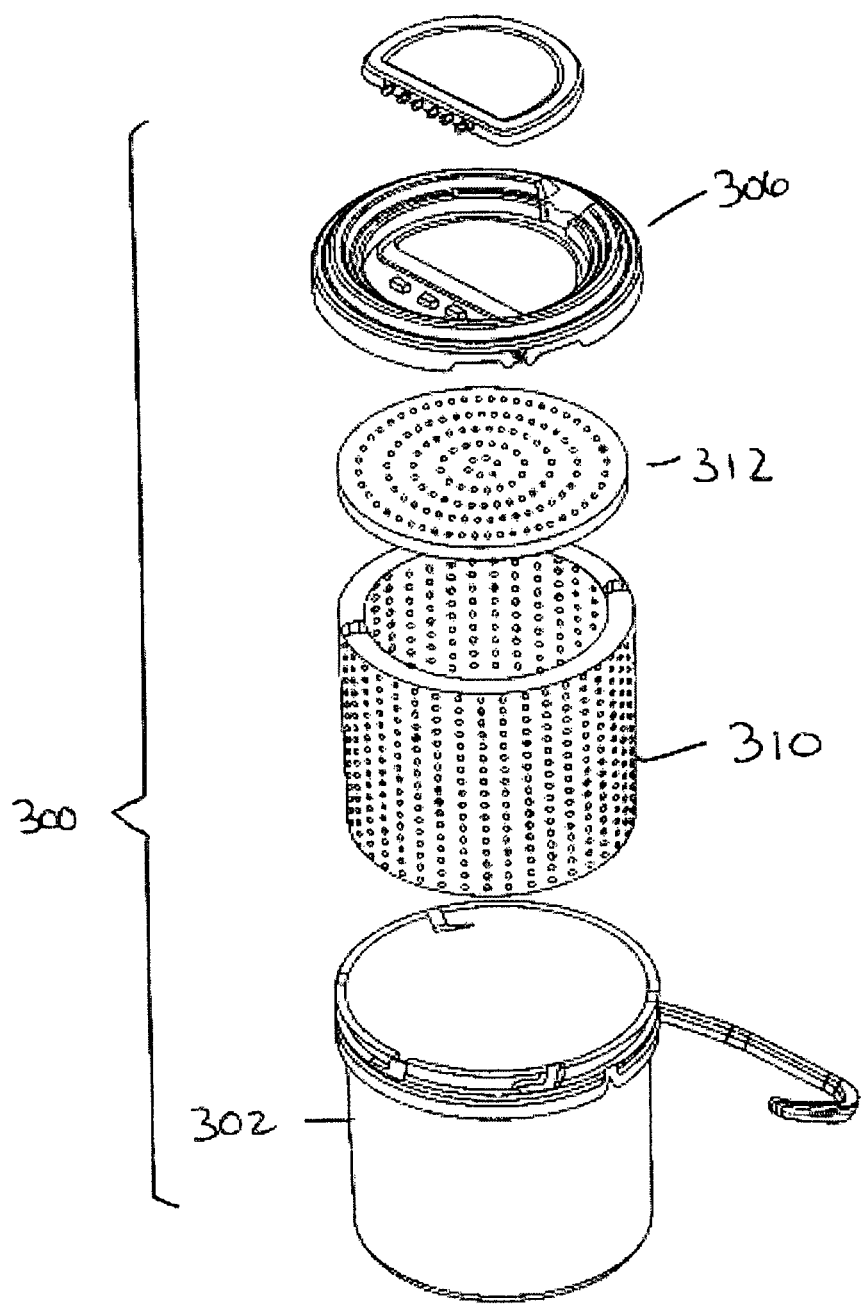
FIG. 13 is an exploded perspective view thereof.
Figure 14:
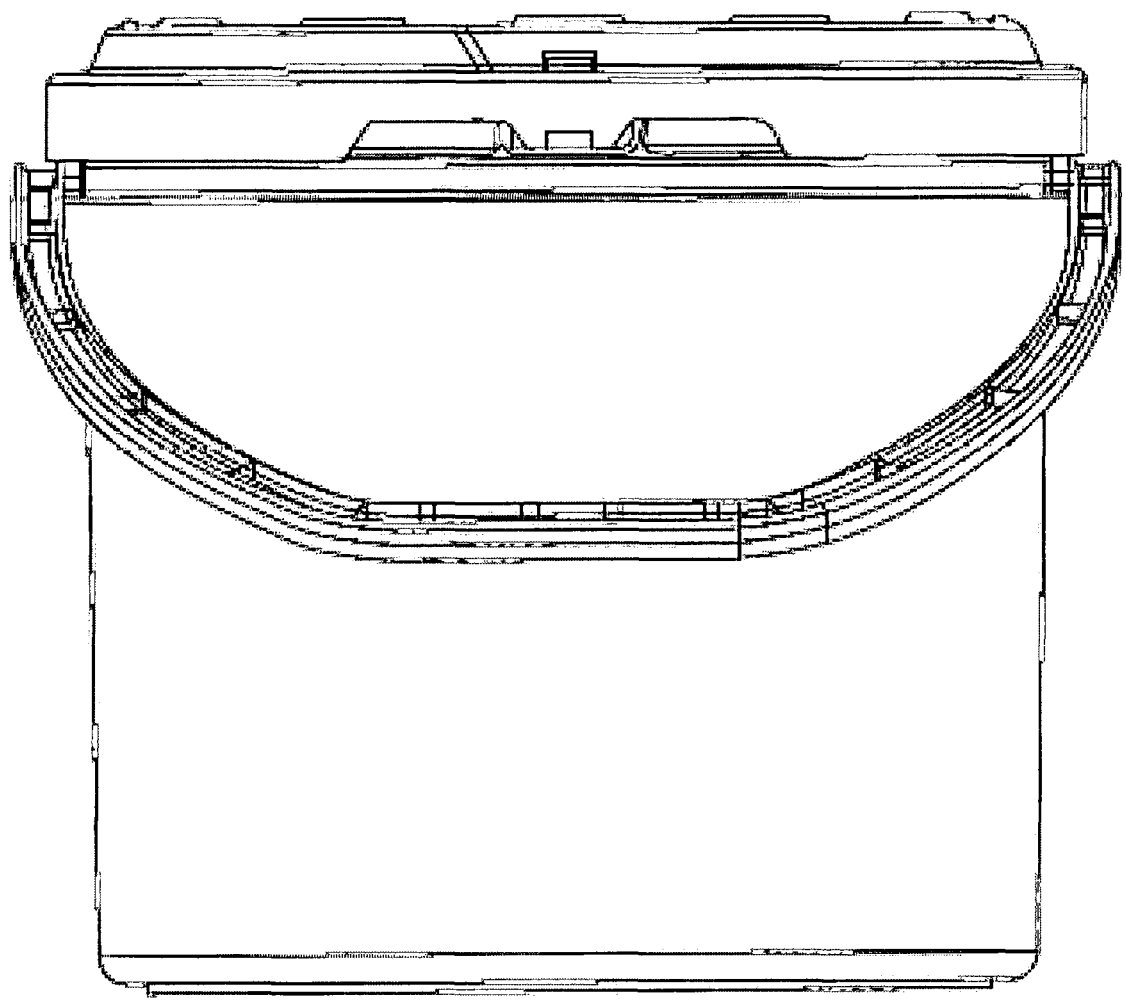
FIG. 14 is a front elevational view thereof.
Figure 15:
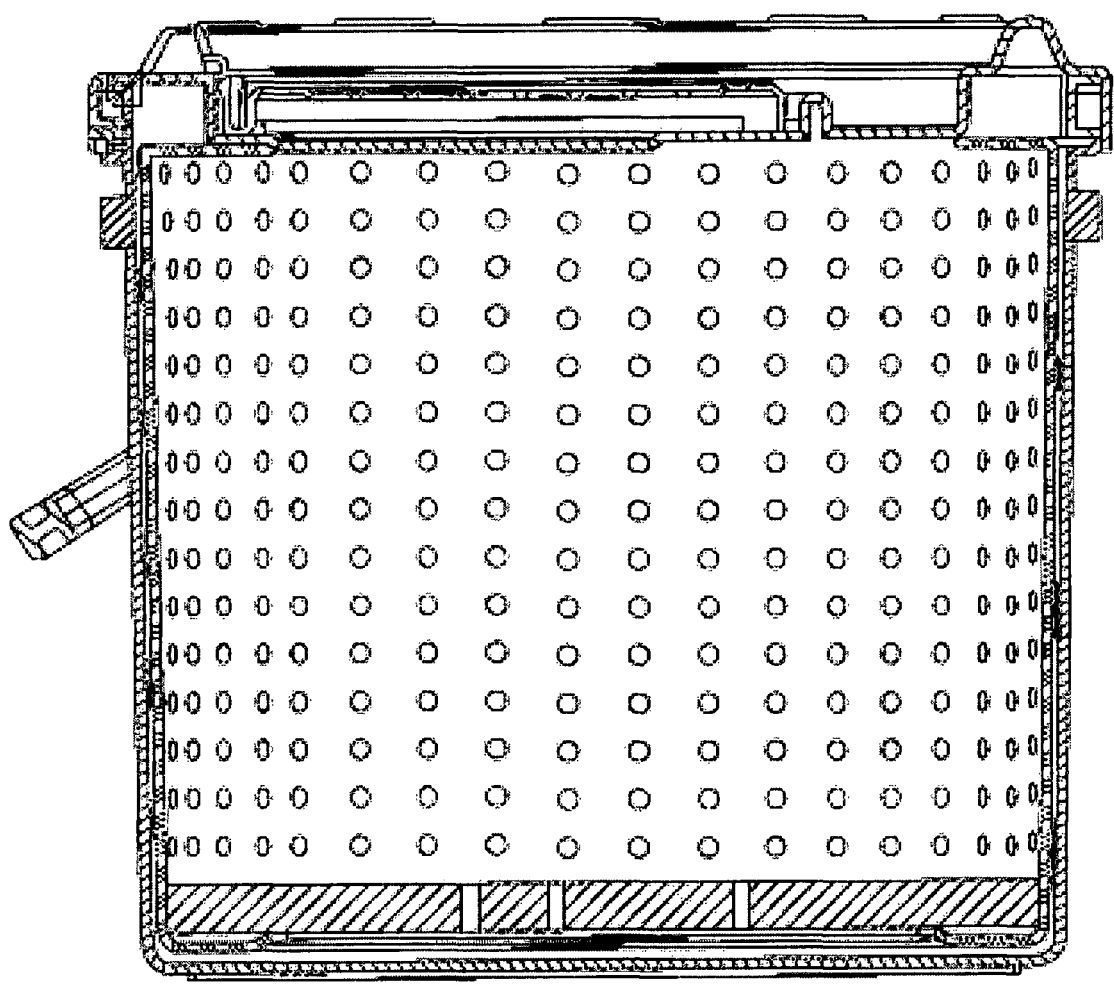
FIG. 15 is a sectional view taken along line XV-XV of FIG. 14.
Figure 16:
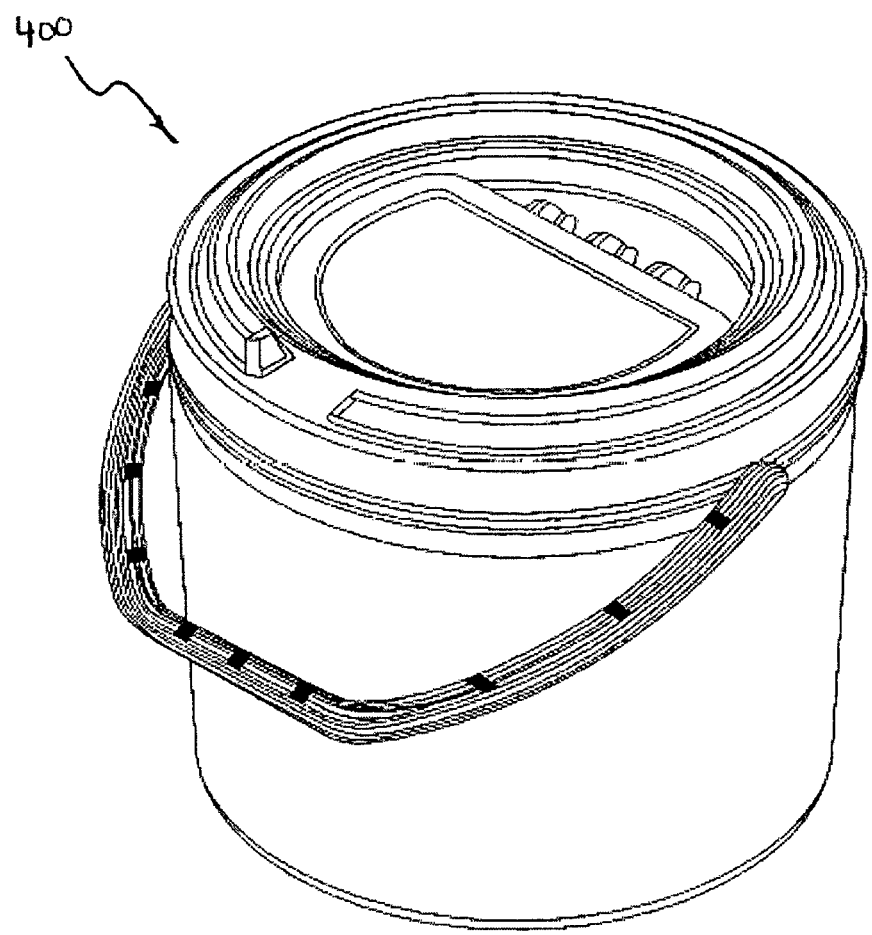
FIG. 16 is a front perspective view of a minnow container 400 according to a third alternate embodiment of the present invention.
Figure 17:
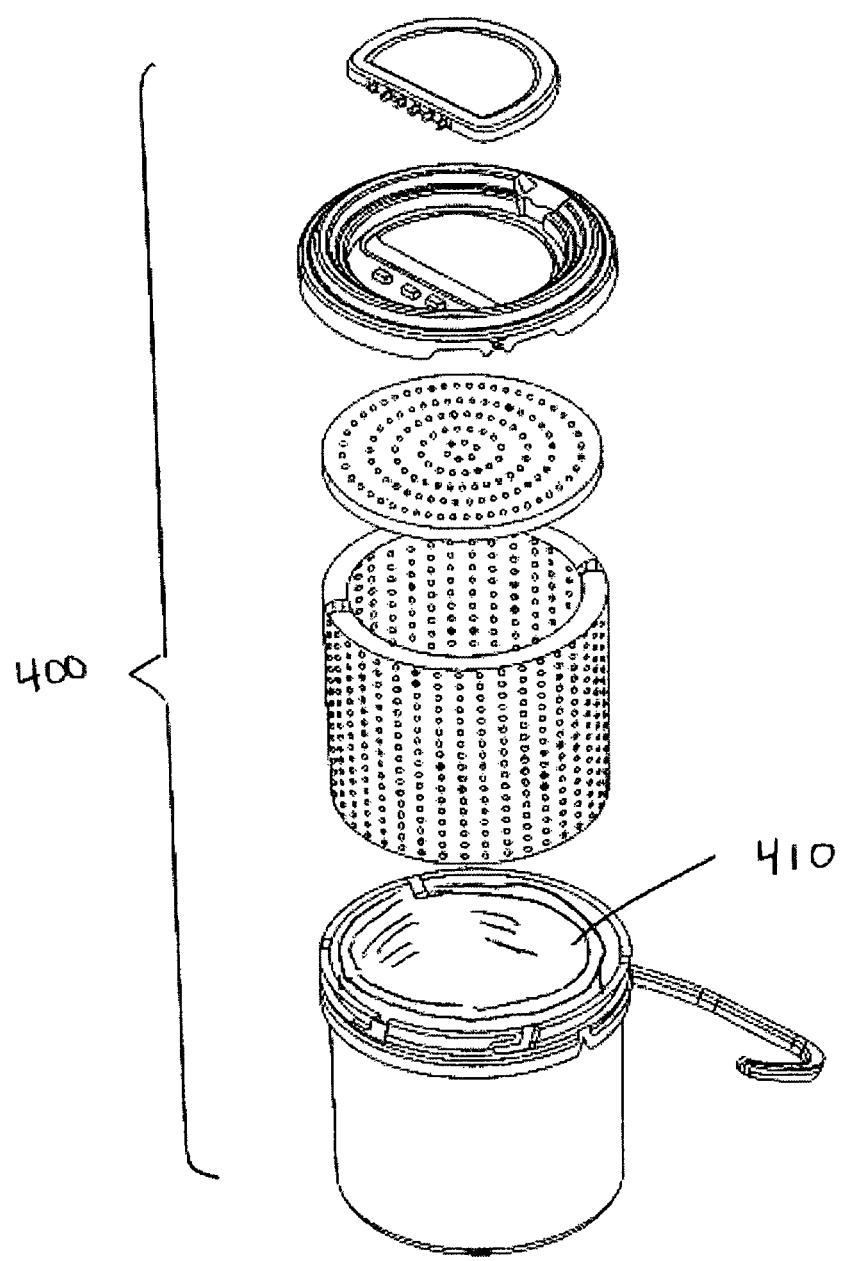
FIG. 17 is an exploded perspective view thereof.
Figure 18:
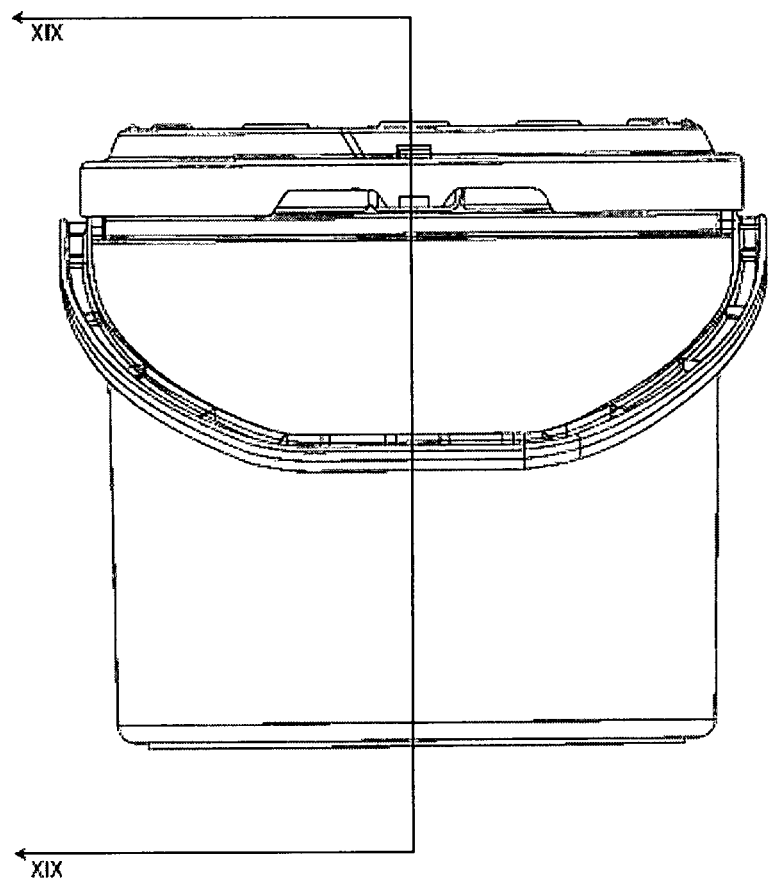
FIG. 18 is a front elevational view thereof.
Figure 19:
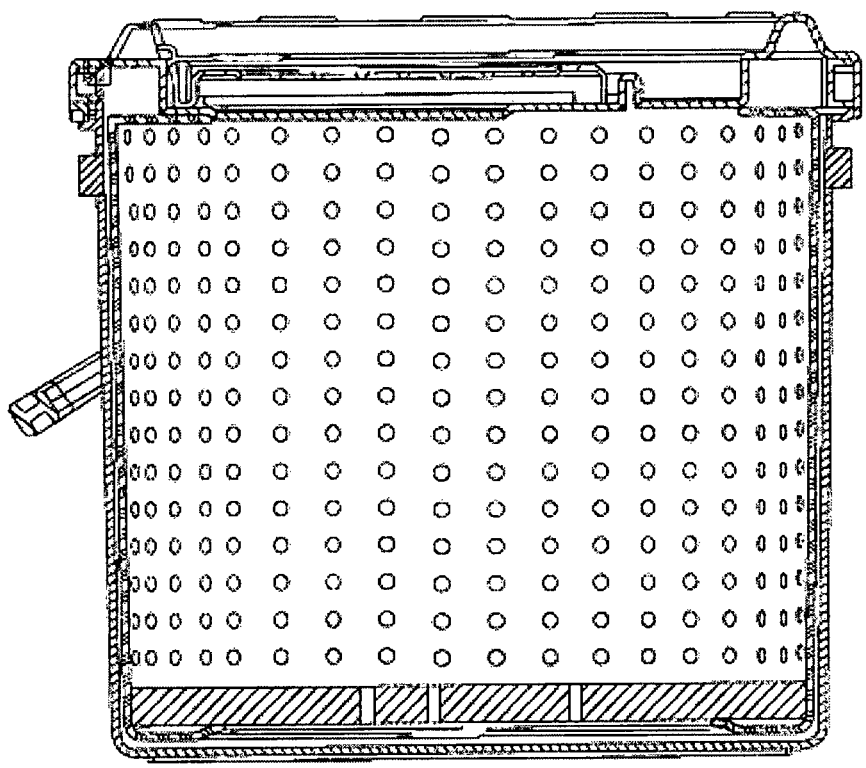
FIG. 19 is a sectional view taken along line XIX-XIX of FIG. 18.

As best shown in conjunction with FIG. 5 through FIG. 7, the first lid 14 comprises an inner surface 40 and an outer surface 42 and is capable of reversibly attaching to the cylinder's first terminus 24 creating an essentially water-tight seal. The first lid 14 further has a longitudinal axis 44 parallel to the cylinder's longitudinal axis 28 when assembled and a transverse axis 46 parallel to the cylinder's transverse axis 30 when assembled.

The second lid 16 comprises an inner surface 50 and an outer surface 52 and is capable of reversibly attaching to the cylinder's second terminus 30 creating an essentially water-tight seal. The second 16 further has a longitudinal axis 54 parallel to the cylinder's longitudinal axis 28 when assembled and a transverse axis 56 parallel to the cylinder's transverse axis 30 when assembled.

In a most preferred embodiment the mode of attachment for each of the cylinder's termini 24, 26 to its associated lid 14, 16, respectively, is a screw-type attachment whereby that portion of the outer surface 22 of the cylinder 12 within about a centimeter from the relevant terminus comprises male-type threads 60 that correspond to female threads 62 located on the inner surface 40, 50 of the relevant lid 14, 16. Obviously, one or more lids could comprise male-type threads corresponding to female-type threads on the cylinder. Another favored embodiment eschews fully separable lids in favor of swing-top canister lids. The lids may further comprise gaskets increase the water-impermeability of the attachment.

As indicated, it is intended that the first lid 14 and the second lid 16 may be of a similar construction, and may be formed of an integrated molded item that includes a lid seal 64 that fits snugly inside the lid 14, 16 without using an undercut nor glue. The external periphery of the lid 14, 16 may further include a plurality of grip indents 66 radially spaced there about. An additional gripping surface may further be incorporated within the grip indents 66, such as ribs or similar tactile engaging structures. A lanyard post 68 may further be formed within the outer surface 42, 52 such as to receive and connect with a lanyard 90, Additionally, an outer lip 92 may further be formed such as to create a recess for the lanyard post 68 and thereby allow for a flat resting surface without interference of the lanyard post 68. With such a construction, a similar design may be used for each lid 14, 16 without interference.

The water-permeable basket 18 comprises an inner surface 70 having a diameter, an outer surface 72 having a diameter, a longitudinal axis 74 parallel to the cylinder's longitudinal axis 28 when assembled, a transverse axis 76 parallel to the cylinder's transverse axis 30 when assembled, an open face 80, and a closed face 82. The basket 18 is of sufficient buoyancy to float in water and support a plurality of minnows 100. In a preferred embodiment, the closed face 82 comprises a buoyant member which accounts for the buoyancy of the basket 18. The diameter of the basket's outer surface 72 is less than the diameter of the cylinder's inner surface 20 so that the basket 18 fits within the cylinder 12. The water-permeable basket 18 further comprises a height 84 measured along its longitudinal axis 74. The water-permeability of the basket 18 may be due to the density of its construction, or due to a plurality of holes 86 in the closed face 82 of the basket 18. Optimally, the basket 18 also comprises holes along its side. All holes in the basket are sufficiently small to prevent minnows moving through them.

As described above, the a preferred embodiment is shown and described for a container for animals or objects in a liquid with key elements being a handle-less buoyant retrieving basket that is urged is urged upward within the liquid in order to deliver the animals or objects to a position where they can more easily be grasped from the container. As may be apparent to one having ordinary skill in the relevant art, and in light of the present teachings, and as is intended such an innovation may be contained within various embodiments other than the preferred embodiment shown. By way of example, and not as a limitation, FIG. 8 through FIG. 11 show a minnow container 200 according to a first alternate embodiment of the present invention. In such an embodiment a container main body 202 is provided of a different form factor, herein shown having a larger capacity. The main body 202 sill includes a lower lid 204, and an upper lid 206. Given the larger volume capacity, the minnow container 200 may be much heavier in operation, and as such a handle 208 is provided in lieu of a lanyard 90 of the preferred embodiment. A basket sidewall 210 and buoyant basket base 212 are equivalently provided for movement within the main body 202 to allow for strain of water as the basket is urged toward the upper opening, thereby urging any contents within said compartment volume toward said upper opening. Given the larger capacity of the minnow container 200, additional ballast, such as the incorporation for a weight element 214 within the lower closure may be provided in order to allow the container 200 to be placed within a body of water, such as a stream, and allow the container 200 to maintain its position.

By way of additional example, and not as a limitation, FIG. 12 through FIG. 15 show a minnow container 300 according to a second alternate embodiment of the present invention. In such an embodiment a container main body 302 is provided of a different form factor, herein shown as being of a bucket where the main body 302 includes an upper lid 306 and a bouyant basket formed of a basket sidewall 310 and bouyant basket base 312. In such an embodiment, the basket is urged toward the upper opening of the bucket when the lid 306 is removed, thereby urging any contents within said bucket toward said upper opening.

As shown in conjunction with FIG. 16 through FIG. 19, a minnow container 400 is shown according to a third alternate embodiment of the present invention. Such an embodiment is similar to the minnow container 300 of the second alternate embodiment, but includes an insulation element 410. It is intended that such an embodiment may be specially adapted for use with cold weather applications, such as ice fishing.

As shown common to all the disclosed embodiments, a bouyant basket is slidably retained within a housing and further forms a porous retrieving compartment volume above a lower strain plate. In all embodiments, when the container is oriented with said upper opening directed upward, the buoyant retrieving basket is urged upward, positioning said lower strain plate toward said upper opening and urging any contents within said compartment volume toward said upper opening. As such, in all configurations the handle-less basket is urged within the container by having a specific gravity lower than that of the liquid intended to be held within the container.

2. Operation of the Preferred Embodiment

In use, the cylinder contains the basket which is oriented such that the basket's closed face is nearest the container's first lid and the basket's open face is nearest the container's second lid. Water and minnows are then added to the cylinder. Water may be added via the cylinder's open first terminus or the cylinder's open second terminus. Minnows, however, need to be added to the container through the cylinder's open second terminus so that the minnows may enter the basket though the basket's open face.

Once filled with water and minnows, and the lids in place, the container may be worn or connected to a structure through use of a lanyard (109) or other similar structure as shown in FIG. 1.

As worn or carried, the closed face of the basket floats near the top of the cylinder where it reaches the cylinder's said lip near the cylinder's first terminus and the container's first lid. The minnows swim beneath the basket's closed face where their activity level may be monitored by the angler.

Figure 3:
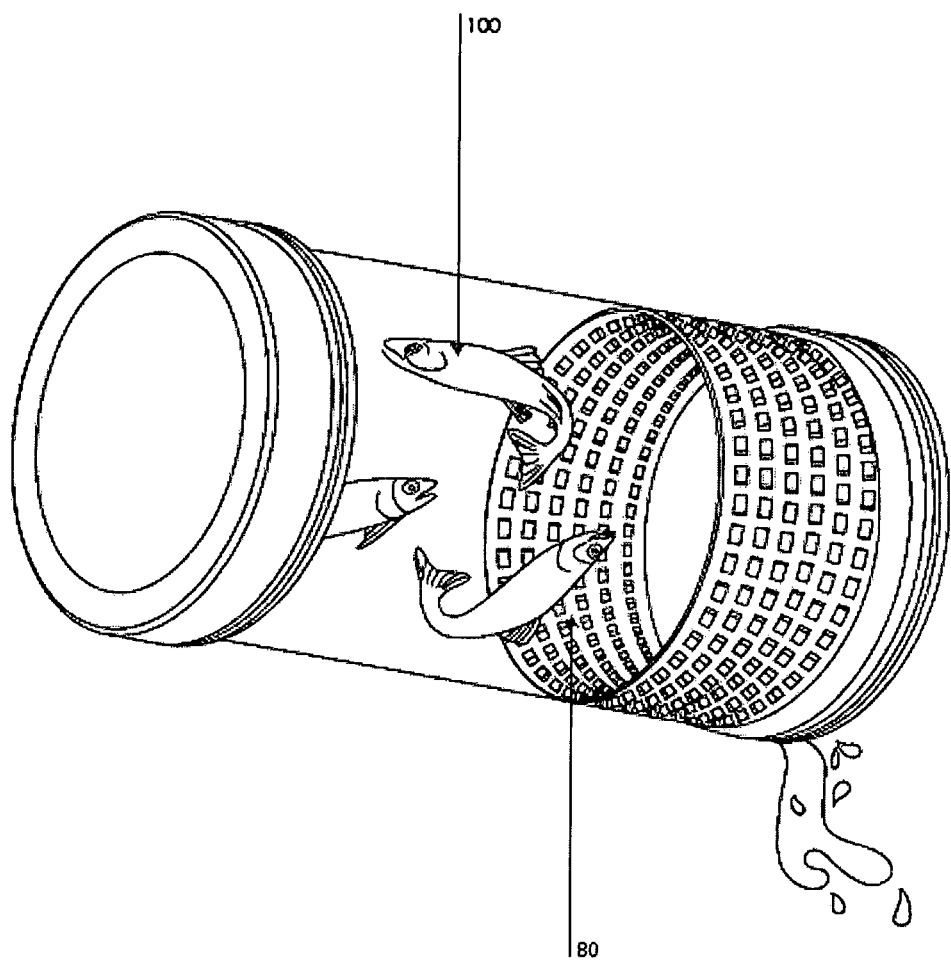
FIG. 3 is another view of the disclosed minnow container with the lid replaced from FIG. 2 and the other lid removed so that the container's water can be replaced.
Figure 4:
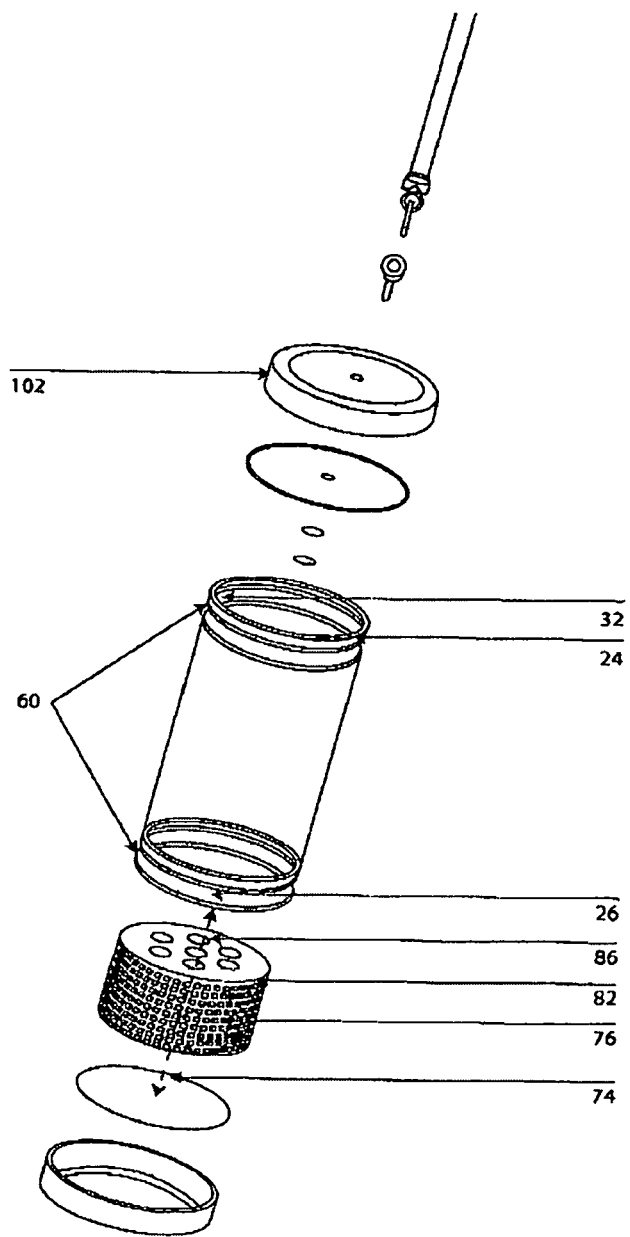
FIG. 4 is an exploded view illustration of a minnow container 10 according to the preferred embodiment of the present invention.

When the angler decides to refresh the water, often due to the minnow activity level dropping, the container's first lid is removed and the container tilted to pour out some or all of the water as shown in FIG. 3. The basket is kept within the cylinder by the cylinder's lip, and the fish as kept in the cylinder due to the holes in the basket's closed face being too small for them to move through. Fresh water can then be added to the cylinder and the first lid replaced. As discussed above, alternative embodiments that replace said lip with another structure having the same function may be used instead with such directions for use appropriately modified.

Figure 2:
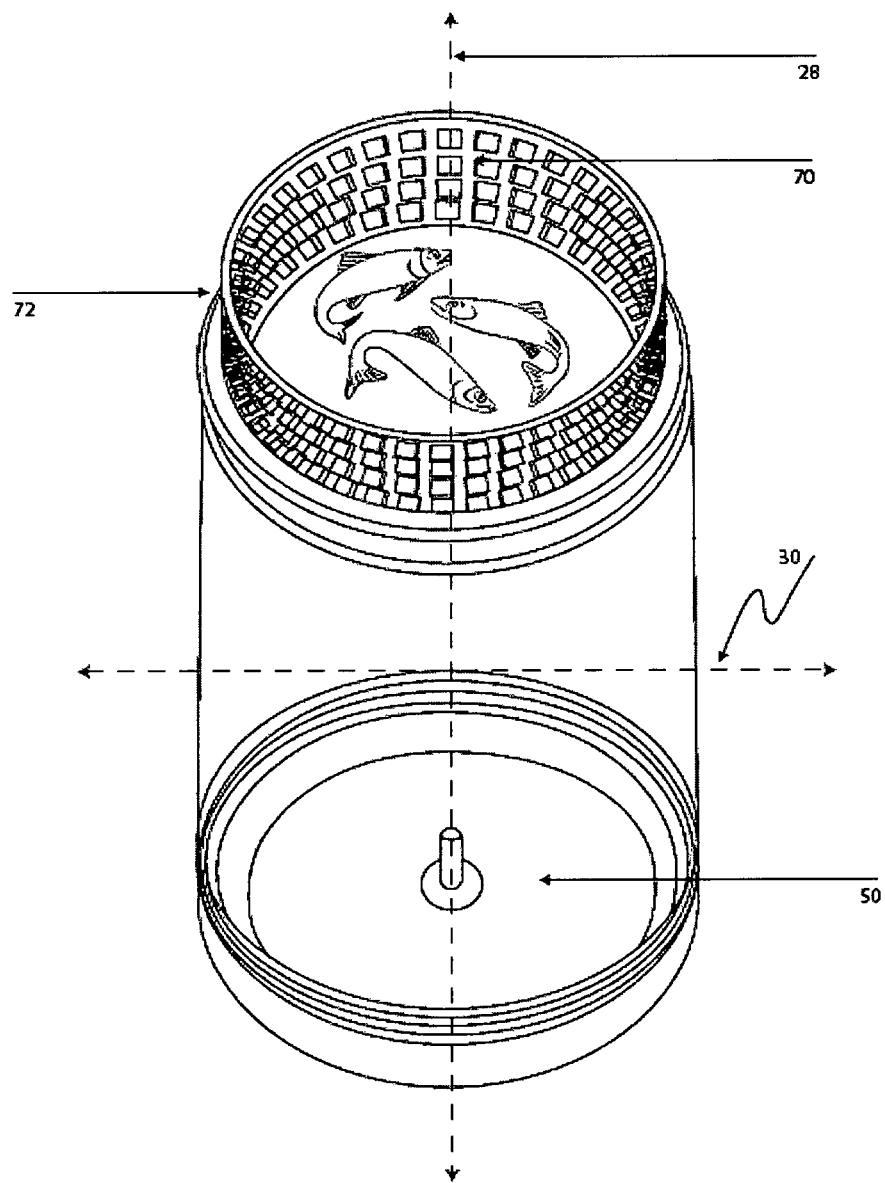
FIG. 2 shows another view of the disclosed minnow container 10 with the minnows raised out of the water by the action of the floating basket after removal of one of the lids.

When the angler wants to remove a minnow, the container is inverted so that the second lid is facing upward and then removed. The floating basket moves towards the cylinder's open second terminus, carrying the minnows with it. The open face of the basket rises above the level of the water in this position and the minnows are held within the basket as shown in FIG. 2. Optimally, the container is filled with a sufficient amount of water so that the closed face of the basket is near the cylinder's second open terminus in this position so that the minnows are most easily accessible by the angler. When access to the minnows is no longer needed, the container's second lid is used to push the basket into the cylinder and is secured in place. The container may then be returned to it's normal position with the first lid at the top.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A bait container comprising:
   a generally cylindrical container comprising a smooth inner surface and a first open terminus opposite a second open terminus and further comprising an inwardly directed lip or flange located substantially near a first open terminus;
   a first sealing element for removably sealing said first open terminus;
   a second sealing element for removably sealing said second open terminus;
   a handle-less buoyant retrieving basket having a specific gravity lower than that of water and slidably retained within said cylindrical container and further comprising:
      a porous, generally cylindrical basket sidewall, said basket is prevented egress through said first open terminus through physical impingement with said lip or flange while being capable of free egress through said second open terminus.

2. The bait container of claim 1, wherein said buoyant retrieving basket further comprises:
   a bait containment volume formed by said cylindrical basket sidewall and having an upper opening opposite a lower bottom;
   a lower strain plate spanning said bottom and allowing for retention of bait;
   wherein said porous, cylindrical sidewall and said lower strain plate both allow for free fluid communication between said bait containment volume and said generally cylindrical container.

3. The bait container of claim 2, wherein said generally cylindrical container is formed so as to allow for visual identification of any contents within said bait containment volume.

4. The bait container of claim 3, wherein said cylindrical container is formed at least partially transparent.

5. The bait container of claim 3, wherein said cylindrical container is capable of being grasped with one hand.

* * * * *